US012703166B2

(12) United States Patent
Chung et al.

(10) Patent No.: US 12,703,166 B2
(45) Date of Patent: Aug. 11, 2026

(54) SYSTEMS AND METHODS FOR WEB-FED DRY FORMING OF FIBER-BASED PRODUCTS

(71) Applicant: Footprint International, LLC, Scottadale, AZ (US)

(72) Inventors: Yoke Chung, Gilbert, AZ (US); Yiyun Zhang, Chandler, AZ (US); David France, Minneapolis, MN (US); Todd Biggs, Queen Creek, AZ (US); Steven Roach, Gilbert, AZ (US)

(73) Assignee: Footprint International, LLC, Gilbert, AZ (US)

( * ) Notice: Subject to any disclaimer, the term of this patent is extended or adjusted under 35 U.S.C. 154(b) by 0 days.

(21) Appl. No.: 18/980,753

(22) Filed: Dec. 13, 2024

(65) Prior Publication Data

US 2025/0196461 A1 Jun. 19, 2025

Related U.S. Application Data

(60) Provisional application No. 63/609,922, filed on Dec. 14, 2023.

(51) Int. Cl.
*B31B 50/59* (2017.01)
*B31B 50/00* (2017.01)
(Continued)

(52) U.S. Cl.
CPC ............ *B31B 50/59* (2017.08); *B31B 50/006* (2017.08); *B31B 50/142* (2017.08); *B31B 50/16* (2017.08);
(Continued)

(58) Field of Classification Search
CPC ..... B31B 50/10; B31B 50/042; B31B 50/252; B31B 50/753; B31B 50/98; B31B 50/006;
(Continued)

(56) References Cited

U.S. PATENT DOCUMENTS

| | | |
|---|---|---|
| 2,425,828 A | 8/1947 | Retzsch et al. |
| 3,041,669 A | 7/1962 | Marshall et al. |

(Continued)

FOREIGN PATENT DOCUMENTS

| | | |
|---|---|---|
| CN | 1103451 A | 6/1995 |
| CN | 108973232 A | 12/2018 |

(Continued)

OTHER PUBLICATIONS

International Search Report and Written Opinion dated May 23, 2025 for International Application No. PCT/US2024/060082, 20 pages.

(Continued)

*Primary Examiner* — Thomas M Wittenschlaeger
(74) *Attorney, Agent, or Firm* — Ashurst Perkins Coie US LLP

(57) ABSTRACT

Disclosed are methods and systems for production of fiber-based, plastic-free products are produced by a web-fed dry forming process. In some embodiments, a method of manufacturing a paper-based packaging product includes conditioning a paper web to optimize a moisture content of the paper web and to treat the paper web with at least one additive to form a conditioned paper web; and dry molding the conditioned paper web under one or both of heat and pressure to produce a plurality of finished paper-based packaging products.

14 Claims, 9 Drawing Sheets

(51) Int. Cl.
*B31B 50/14* (2017.01)
*B31B 50/16* (2017.01)
*B31B 50/74* (2017.01)
*B31B 50/88* (2017.01)
*B31B 120/10* (2017.01)

(52) U.S. Cl.
CPC .......... *B31B 50/741* (2017.08); *B31B 50/747* (2017.08); *B31B 50/88* (2017.08); *B31B 2120/10* (2017.08)

(58) Field of Classification Search
CPC ....... B31B 50/59; B31B 50/592; B31B 50/88; B31B 50/741; B31B 50/142; B31B 50/16; B31B 50/747; B31B 50/25; B31B 2120/10; B27N 3/203; B27N 3/007; B27N 3/18; B27N 3/04; B27N 5/02; B27N 5/00; B27N 1/00; B27N 7/005; B31F 1/0077; B31F 1/38; B31F 1/18; B31F 1/08; B31F 1/36; B31D 5/02; B26F 2001/4481
See application file for complete search history.

(56) References Cited

U.S. PATENT DOCUMENTS

| | | | |
|---|---|---|---|
| 3,357,053 | A | 12/1967 | Lyon et al. |
| 3,567,575 | A | 3/1971 | Emery et al. |
| 3,615,795 | A | 10/1971 | Schulwitz et al. |
| 4,088,259 | A | 5/1978 | Sutton |
| 4,313,899 | A | 2/1982 | Hain |
| 4,755,128 | A | 7/1988 | Alexander et al. |
| 4,755,129 | A | 7/1988 | Baker et al. |
| 5,385,764 | A | 1/1995 | Andersen et al. |
| 6,210,531 | B1 | 4/2001 | Bradford |
| 6,352,617 | B1 | 3/2002 | Lee |
| 6,461,480 | B1 | 10/2002 | Otakura et al. |
| 6,468,398 | B1 | 10/2002 | Kumamoto et al. |
| 6,576,089 | B1 | 6/2003 | Sato et al. |
| 9,856,608 | B1 | 1/2018 | Chung et al. |
| 9,869,062 | B1 | 1/2018 | Chung et al. |
| 9,988,199 | B2 | 6/2018 | Chung et al. |
| 10,036,126 | B2 | 7/2018 | Chung et al. |
| 10,039,238 | B2 | 8/2018 | Samet |
| 10,087,584 | B2 | 10/2018 | Chung et al. |
| 10,124,926 | B2 | 11/2018 | Chung et al. |
| 10,240,286 | B2 | 3/2019 | Chung et al. |
| 10,377,547 | B2 | 8/2019 | Chung et al. |
| 10,428,467 | B2 | 10/2019 | Chung et al. |
| 10,638,611 | B2 | 4/2020 | Nishikawa et al. |
| 10,683,611 | B2 | 6/2020 | Chung et al. |
| 11,051,460 | B2 | 7/2021 | Andersen et al. |
| 11,717,993 | B2 | 8/2023 | Larsson et al. |
| 2003/0136537 | A1 | 7/2003 | Frederiksen et al. |
| 2004/0041305 | A1 | 3/2004 | Tsuura et al. |
| 2004/0045690 | A1 | 3/2004 | Eto et al. |
| 2004/0241274 | A1 | 12/2004 | Odajima et al. |
| 2005/0150624 | A1 | 7/2005 | Toh et al. |
| 2007/0212505 | A1 | 9/2007 | Dijstra et al. |
| 2007/0227680 | A1 | 10/2007 | Kim et al. |
| 2009/0139678 | A1 | 6/2009 | Nilsson et al. |
| 2010/0193578 | A1* | 8/2010 | Sanders ............... B65D 65/403 493/93 |
| 2010/0310893 | A1 | 12/2010 | Derbyshire et al. |
| 2012/0305210 | A1 | 12/2012 | Nilsson et al. |
| 2012/0312492 | A1 | 12/2012 | Nilsson et al. |
| 2014/0096487 | A1 | 4/2014 | Nolsen et al. |
| 2015/0033624 | A1 | 2/2015 | De La Martiniere et al. |
| 2015/0145182 | A1 | 5/2015 | Jones et al. |
| 2015/0203223 | A1* | 7/2015 | Ehrmann ................ B65B 7/164 493/52 |
| 2015/0292154 | A1 | 10/2015 | Zheng et al. |
| 2016/0168793 | A1 | 6/2016 | Kuo et al. |
| 2016/0319490 | A1 | 11/2016 | Wang et al. |
| 2018/0029765 | A1 | 2/2018 | Chung et al. |
| 2018/0029766 | A1 | 2/2018 | Chung et al. |
| 2018/0029767 | A1 | 2/2018 | Chung et al. |
| 2018/0339826 | A1 | 11/2018 | Chung et al. |
| 2018/0340296 | A1 | 11/2018 | Chung et al. |
| 2019/0218711 | A1* | 7/2019 | Chung ................... D21H 27/10 |
| 2020/0206984 | A1 | 7/2020 | Chung et al. |
| 2021/0172120 | A1 | 6/2021 | Constant et al. |
| 2022/0136174 | A1 | 5/2022 | Chung et al. |
| 2022/0234258 | A1 | 7/2022 | Larsson et al. |
| 2022/0235186 | A1 | 7/2022 | Nikkola et al. |
| 2022/0251785 | A1 | 8/2022 | Guidotti et al. |
| 2022/0394980 | A1 | 12/2022 | Hong et al. |
| 2023/0331953 | A1 | 10/2023 | Loic |
| 2023/0373181 | A1 | 11/2023 | Chun et al. |
| 2024/0066851 | A1 | 2/2024 | Field et al. |
| 2024/0417928 | A1* | 12/2024 | Hausmann ................ D21J 3/00 |

FOREIGN PATENT DOCUMENTS

| | | | | |
|---|---|---|---|---|
| CN | 113152143 | B | 5/2022 | |
| DE | 102021114742 | A1 | 6/2021 | |
| EP | 1492926 | A1 | 1/2005 | |
| GB | 0456434 | A | 8/1935 | |
| JP | 05-050512 | A | 3/1993 | |
| WO | 2016/123701 | A1 | 8/2016 | |
| WO | 2018/217920 | A1 | 11/2018 | |
| WO | WO-2025008658 | A1 * | 1/2025 | ........... B31B 50/741 |

OTHER PUBLICATIONS

Decision to grant a European patent received for European Application No. 18805767.3, mailed on Aug. 8, 2024, 2 pages.
Extended European Search Report and Search Opinion received for European Application No. 18805767.3, mailed on Apr. 12, 2021, 6 pages.
Extended European Search Report and Search Opinion received for European Application No. 24195706.7, mailed on Mar. 19, 2025, 5 pages.
Intention to Grant received for European Application No. 18805767.3, mailed on Mar. 12, 2024, 6 pages.
Internation Search Report and Written Opinion dated Sep. 26, 2026 for International Application No. PCT/US2018/034176, 20 pages.
International Search Report and Written Opinion dated Feb. 5, 2026 for International Application No. PCT/US25/050025, 4 pages.
International Search Report and Written Opinion dated Jul. 17, 2025 for International Application No. PCT/US2025/024163, 9 pages.
International Search Report and Written Opinion dated May 23, 2025 for International Application No. PCT/US24/60082, 20 pages.

* cited by examiner

SYSTEMS AND METHODS FOR WEB-FED DRY FORMING OF FIBER-BASED PRODUCTS

CROSS-REFERENCE TO RELATED APPLICATIONS

This patent document claims priority to and the benefit of U.S. Provisional Patent Application No. 63/609,922, filed Dec. 14, 2023, which is incorporated herein by reference in its entirety.

TECHNICAL FIELD

The present technology relates, generally, to the manufacture of plastic-free, fiber-based products and, more particularly, to designs, chemistry, and tooling for dry forming plastic-free, fiber-based products using a substantially dry web or sheet format.

BACKGROUND

Molded fiber is a packaging material typically made from a pulp of recycled paperboard and considered an environmentally sustainable packaging option. Molded pulp manufacturing has experienced increased popularity in recent years in a wide range of applications, including, for example, cups, bowls, straws, and the like. Fiber-based packaging products are biodegradable, compostable and, unlike plastics, do not migrate into the ocean.

Molded fiber processing can generally be categorized as either "wet" or "dry". The two most common types of "wet" molded pulp are classified as Type 1 and Type 2. Type 1 wet molded pulp manufacturing, also referred to as "wet-laid forming," uses a fiber slurry made from ground newsprint, kraft paper or other fibers dissolved in water. A mold mounted on a platen is dipped or submerged in the slurry and a vacuum is applied to the generally convex backside. The vacuum pulls the slurry onto the mold to form the shape of the package. While still under the vacuum, the mold is removed from the slurry tank, allowing the water to drain from the pulp. Air is then blown through the tool to eject the molded fiber piece. The part is typically deposited on a conveyor within a drying oven.

Type 2 wet molded pulp manufacturing is typically used for packaging electronic equipment, cellular phones and household items with containers having particular wall dimensions. Type 2 molded pulp uses the same material and follows the same basic process as Type 1 manufacturing up the point where the vacuum pulls the slurry onto the mold. After this step, a transfer mold mates with the fiber package, moves the formed "wet part" to a hot press, and compresses and dries the fiber material to increase density and provide a smooth external surface finish.

Unlike wet molded pulp manufacturing, dry processing of mold pulp products does not use a wet slurry, but instead employs substantially dry pulp materials used to form a dry web that is then pressed to create molded products. For example, air-laid webs are produced by mixing fibers with air to form a uniform air fiber mixture which is then pressed or vacuum-pulled into a flat blank.

SUMMARY

Disclosed are methods and systems for production of fiber-based, plastic-free products are produced by a web-fed dry forming process (also referred to as "roll-fed" or "paper-fed" process). In some aspects, the disclosed web-fed dry forming process is configured to be implemented in a continuous process or in a partially continuous process.

In accordance with various embodiments, a method of manufacturing a paper-based packaging product includes conditioning a paper web to optimize a moisture content of the paper web and to treat the paper web with at least one additive to form a conditioned paper web; and dry molding the conditioned paper web under one or both of heat and pressure to produce a plurality of finished paper-based packaging products.

In accordance with various embodiments, a system for manufacturing a paper-based packaging product includes a conditioning apparatus, comprising one or more fluid dispensing units and one or more heating units, configured to condition a paper web that is web-fed into the conditioning apparatus by optimizing a moisture content of the paper web and by treating the paper web with at least one additive to form a conditioned paper web; and a dry forming apparatus, comprising at least one slitting tool, at least one pressing tool, and at least one cutting tool, configured to dry mold one or more portions of the conditioned paper web under one or both of heat and pressure to produce a plurality of finished paper-based packaging products.

In accordance with various embodiments, a web-fed dry forming method includes conditioning a first region of a continuously-fed or partially continuously-fed paper web to optimize a moisture content and to treat the paper web with at least one additive to form a conditioned paper web region (which may be done off-line or in-line), wherein the additive may include one or more of a strengthener, an oleophobic additive, wet steam, dry steam, and/or a hydrophobic additive; perforating or pre-slitting the conditioned paper web region to form a perforated web region; pressing the perforated web region to form a pressed web region; cutting the pressed web region to form finished, cut product regions; transporting the finished products to a storage region; and winding the remaining paper web region to a second web roll.

Various features and characteristics will also become apparent from the subsequent detailed description and the appended claims, taken in conjunction with the accompanying drawings and this background section

BRIEF DESCRIPTION OF THE DRAWINGS

Exemplary embodiments will hereinafter be described in conjunction with the appended drawing figures, wherein like numerals denote like elements, and.

DETAILED DESCRIPTION

Figure 1A:
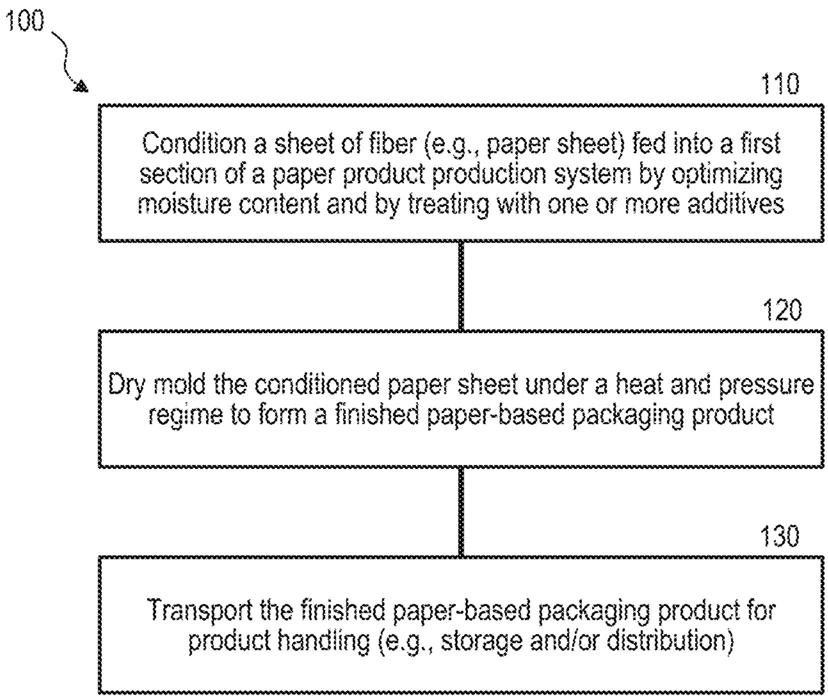
FIG. 1A is a diagram depicting a web-fed dry forming fiber-based packaging manufacturing method in accordance with the present technology.

Aspects of the present technology are generally directed to advanced systems and methods for web-fed dry forming of molded fiber products. In various embodiments, the disclosed fiber-based web-fed dry forming techniques allow the fiber web to flow within successive processing chamber (s) and utilize heat and pressure to reshape the fiber web to form the molded fiber products. The disclosed techniques and systems are able to produce a variety of fiber-based products, including paper-based packaging products made from renewable resources like recycled paper fiber and replanted trees. While the disclosed embodiments are primarily directed to the production of paper-based packaging products, it is understood that paper-based packaging products are used as an example and the disclosed methods and systems can be implemented or adapted to produce other fiber-based products.

Unlike existing techniques that require paper pressing, the present technology is expected to decrease or eliminate creases, pleats, and folds in the final product (e.g., at a flange and/or side wall). The disclosed techniques may be implemented on a variety of fiber-based products presently known or to later be developed, including but not limited to quick-serve restaurant (QSR) paper plates, trays, clamshell boxes, bowls, and cups; hot/cold drinking paper cups; packaging materials for frozen, refrigerated, microwaveable, and oven-heated food containers; dairy fiber packages, and the like.

The present technology is expected to provide efficiencies in comparison to current wet molding and dry molding techniques. For example, wet-laid molding processes can be difficult to scale and, therefore, the products must be produced in relatively small batches. Air-laid forming processes require multiple steps and touchpoints that increase the complexity of the web forming process. Wet molding processes also require more time and energy consumption (e.g., for drying) than roll-fed processes, typically only used in the plastics industry. In contrast, the present technology is expected to allow for large scale molding as the web-fed process can run continuously or substantially continuously as the fiber web (e.g., paper web) moves through various processes to form large, batch molded products. It is understood herein that "continuous" refers to a process or subprocess that is on-going and without planned interruptions for a period or interval, and it is understood that interruptions or pauses between periods and intervals may occur for a continuous process or subprocess. In some embodiments of the present technology, the web-fed process can run partially continuously as the fiber web (e.g., paper web) moves through various processes to form large, batch molded products. It is understood herein that "partially continuous" refers to a process or subprocess that is on-going, but with one or more planned interruptions for a period or interval after which it continuous again.

Specific details of several embodiments of the present technology are described herein with reference to FIGS. 1A-6. The present technology, however, can be practiced without some of these specific details. In some instances, well-known structures and techniques often associated with fiber-based molding processes have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms can even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements can be arbitrarily enlarged to improve legibility. Component details can be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

Figure 1B:
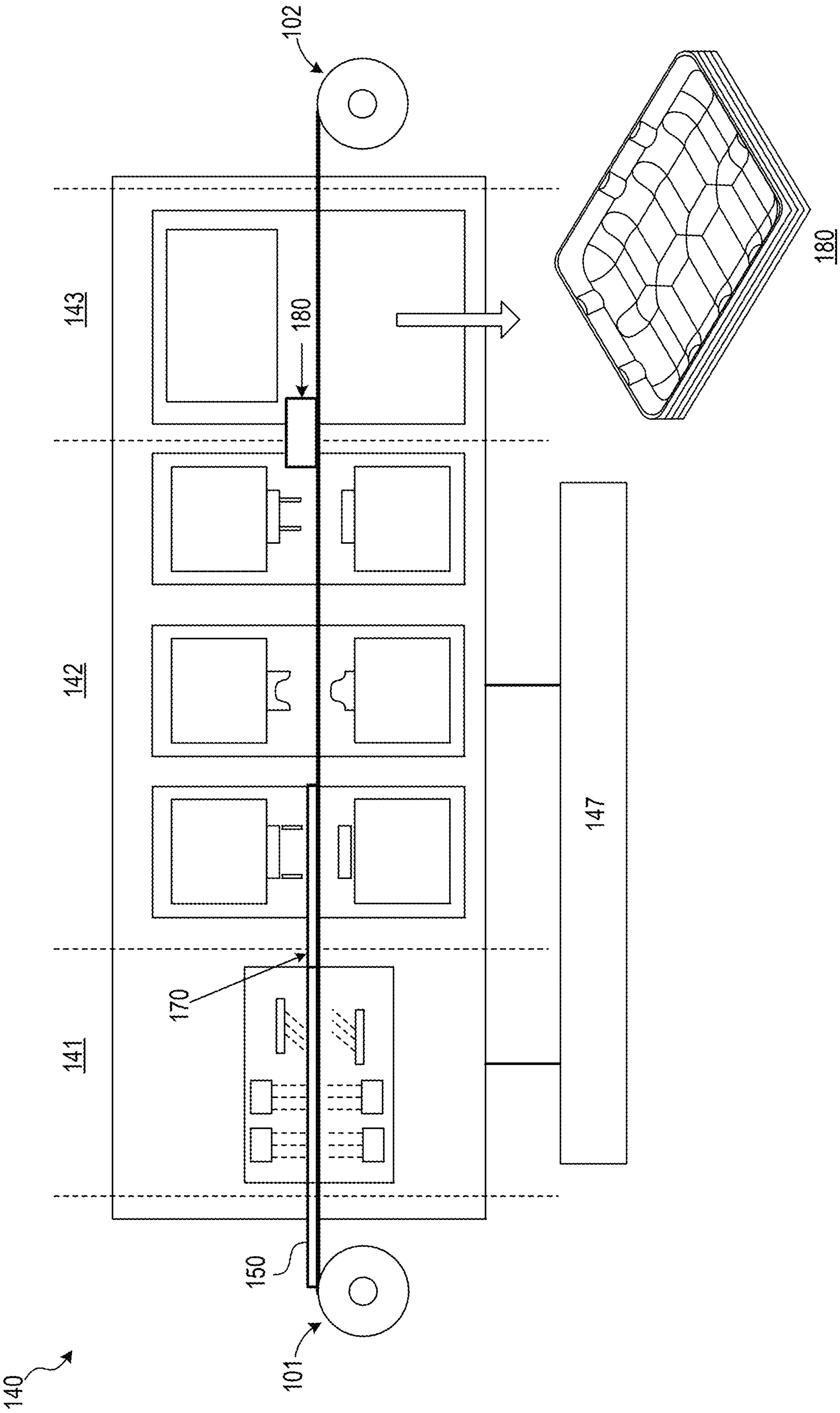
FIG. 1B is diagram depicting a system for implementing the method shown in FIG. 1A, in accordance with embodiments of the present technology.

FIGS. 1A and 1B show diagrams depicting a web-fed fiber material dry forming method 100 for producing fiber-based packaging articles using a fiber-based packaging product production system 140, in accordance with example embodiments of the present technology. As discussed below, the method 100 includes a first process 110 ("conditioning process") and a second process 120 ("dry molding process"), and optionally a third process 130 ("transport process"), that can be implemented by various embodiments of the system 140. The diagram of FIG. 1B illustrates an embodiment of the system 140 that implements an example embodiment of the method 100 where a web of fiber material 150 (e.g., "paper web") is continuously fed through each of the first process 110, the second process 120, and the (optional) third process 130 to yield a finished fiber-based packaging product 180.

Referring to FIGS. 1A and 1B together, in some embodiments, the method 100 includes the first process 110 ("conditioning process") that conditions the web of fiber material 150 (e.g., "paper web") with a predetermined moisture content (e.g., an optimized moisture content) and/or with one or more additives while the paper web 150 is fed through a first section 141 of a fiber-based packaging product production system 140, which yields a conditioned paper web 170 that can be subsequently molded to produce a final product. In some embodiments, for example, a moisture content (MC) optimization or enhancement process is performed to control the amount of water in the paper web 150. In some embodiments of the conditioning process 110, the one or more additives may include a chemical compound or compounds that can affect the properties and characteristics of the final product, such as to increase strength and/or to reduce oil, water, or vapor permeability of the finished paper-based packaging product. Additives can be conditioned internally in the paper web 150 (e.g., intrinsic) and/or conditioned externally on the paper web 150 (e.g., spray coated or other deposition technique) for the purpose of improving rigidity, barrier formation, and/or other functionalities of the conditioned paper web 170. These and other embodiments and implementations of the conditioning process 110 are discussed in further detail below (in "Conditioning Process" subsection).

The method 100 continues with the second process 120 ("dry molding process") to dry mold the conditioned paper web 170 under a heat and pressure regime in a second section 142 of the system 140 to form the finished fiber-based packaging product 180. The method 100 can further include the third process 130 ("transport process") to transport the finished fiber-based packaging product 180 from a third section 143 of the system 140 for product handling, including but not limited storage, further operation(s), and/or distribution.

In some embodiments of the method 100, the conditioning process 110 is continuous with the dry forming process 120 and transport process 130. That is, the paper web 150 is continuously fed to the first section 141 for moisture content optimization and additive treatment to form the conditioned paper web 170, and the just-formed conditioned paper web 170 is continuously fed to the second section 142 for dry forming (molding) to produce the finished paper-based packaging product 180, which is subsequently fed to the third section 143 for transport and handling. Whereas, in some embodiments of the method 100, the conditioning process 110 is a preliminary process where the conditioned paper web 170 is stored (e.g., temporarily) before undergoing the dry molding process 120 to produce the finished paper-based packaging product 180 and transported for handling.

As shown in FIG. 1B, in some embodiments of the system 140, a substantially flat paper web 150 is continuously fed from a roll 101 configured to dispense the paper material into the first section 141, through the second section 142 and the third section 143, and out to a roll 102 configured to outside the third section 143. In some example embodiments of the system 140, the roll 101 and the roll 102 can utilize a suitable web feeder arrangement, e.g., including paper blank (e.g., spool structure) and a paper roll feeding mechanism including a belt or wire between spool structures and a motor to drive movement of the belt or wire (not shown). Also, for example, the system 140 can include a control system 147 that may include associated controller devices or systems, sensors, and the like, which can be included in the first section 141 and/or second section 142 (not shown in FIG. 1B), e.g., including but not limited to humidity sensor(s), temperature sensor(s), pressure sensor(s), pH sensors, etc. and actuator control systems to operate interconnected fluid dispenser(s), heater(s), vacuum(s) and/or gas pump(s), etc. based on detected parameters by the sensor(s). The speed of the paper web 150 through the process may be selected based on the nature of the conditioning process 110 and the dry molding process 120, as described in further detail below.

Figure 1C:
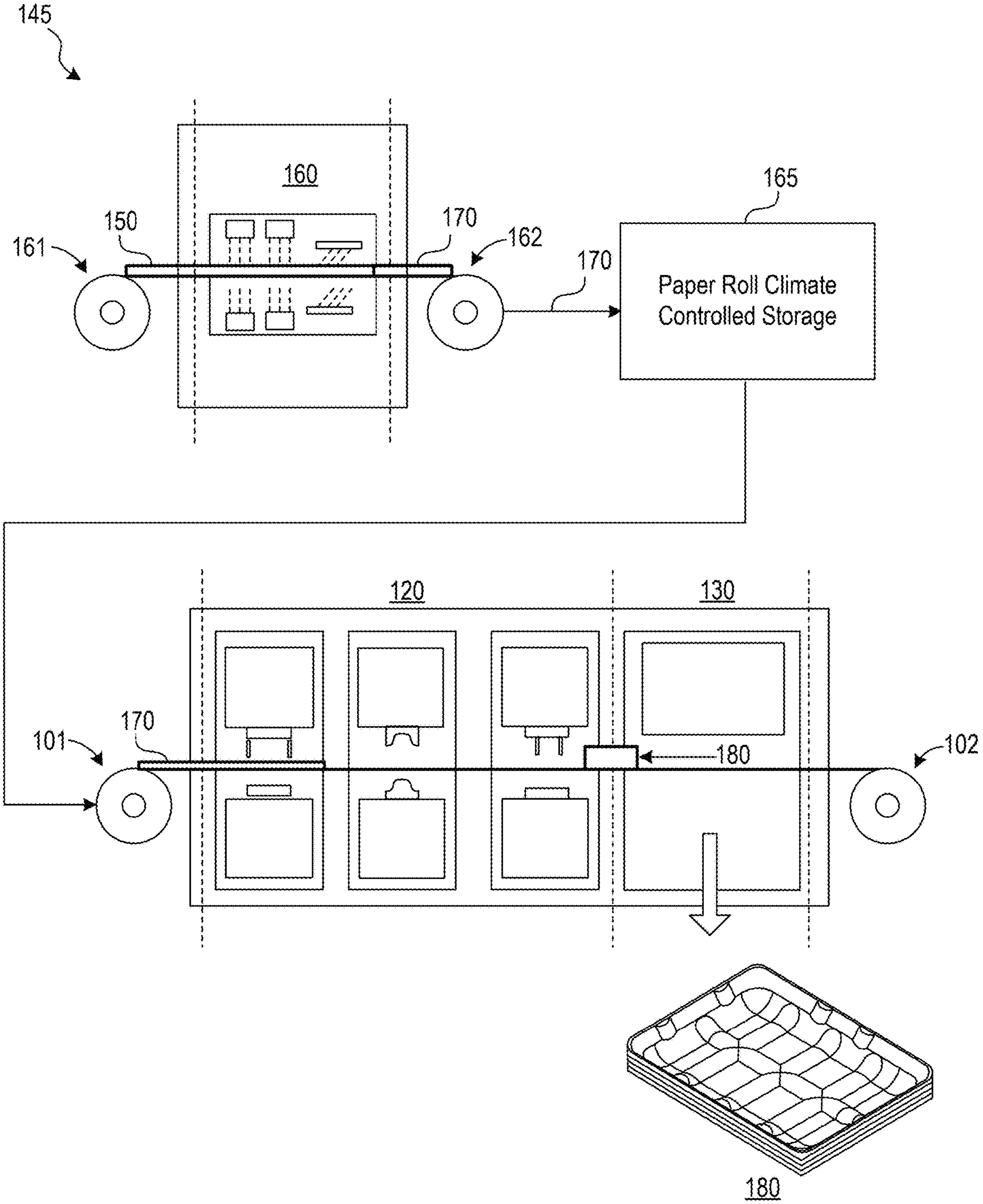
FIG. 1C is diagram depicting a system for implementing the method shown in FIG. 1A, in which paper conditioning is performed "off-line" or as a preliminary step to dry forming and transport in accordance with embodiments of the present technology.

While FIG. 1B illustrates an embodiment in which conditioning of the paper web is performed "in-line" (i.e., substantially contemporaneously with the subsequent operations), in additional embodiments, shown in FIG. 1C, the paper roll may be conditioned "off-line" via a separate conditioning process 160. The separate conditioning process 160 can be configured according to various example embodiments of the conditioning process 110. Such embodiments of the method 100 that include the off-line conditioning process 160 can be implemented by an example embodiment of the fiber-based packaging product production system 140, shown in FIG. 1C as system 145.

As shown in FIG. 1C, in some embodiments of the off-line conditioning process 160, the paper web 150 progresses from roll 161 through the first section 141 of the system 149 to roll 162 and is subsequently stored in a suitable climate-controlled storage facility 165 of the system 140 (also referred to as "storage 165") prior to implementing the processes 120 and 130. In some embodiments, the storage facility 165 can have a humidity or humidity range between 50% and 99% (e.g., 50%-70% humidity, 50%-94% humidity) to maintain a desired degree of moisture content in the paper roll 162. In some embodiments, the humidity of the storage facility 165 may be lower than 50% or up to 100%. The humidity can be selected based, in part, on the desired moisture content of the roll 162 during molding, the duration of storage of the roll 162, the composition of the roll 162, the time between removal from the storage facility 165 and molding, the time allocated for the conditioning stage, the external environment, and/or other factors related to the roll 162 and/or the molding process. For example, the storage facilities 165 may have higher humidity when the roll 162 is stored for a short period of time as the short duration mitigates risk of mold and the higher humidity maintains the roll 162 at or near a predetermined moisture content level for dry molding, thereby reducing the total conditioning time (e.g., reducing or eliminating the time needed for rehydration). In some embodiments, the storage facility 165 can be controlled to maintain a specific temperature or temperature range, such as 55° F. (12.78° C.) to 100° F. (37.78° C.).

Also, as shown in FIG. 1C, in some embodiments, the method 100 includes the off-line conditioning process 160 to condition the paper web 150 by modifying (e.g., optimizing) the moisture content and treating with one or more additives to yield the conditioned paper web 170. The conditioned paper web 170 is then placed in storage prior to subsequent dry molding process 120 and (optional) transport process 130 of the method 100. In such embodiments, for example, the first section 141 of the system 140 where the off-line conditioning process 160 is implemented can be physically separated from the second section 142 and third section 143 of the system 140. In such examples, the roll 161 and roll 162 (that feed the paper web 150 through the first section 141 for the off-line conditioning process 160) are not connected to the roll 101 and roll 102, which the feed the (previously stored) conditioned paper web 170 through sections 142 and 143 for the dry molding process 120 and the transport process 130.

Figure 1D:
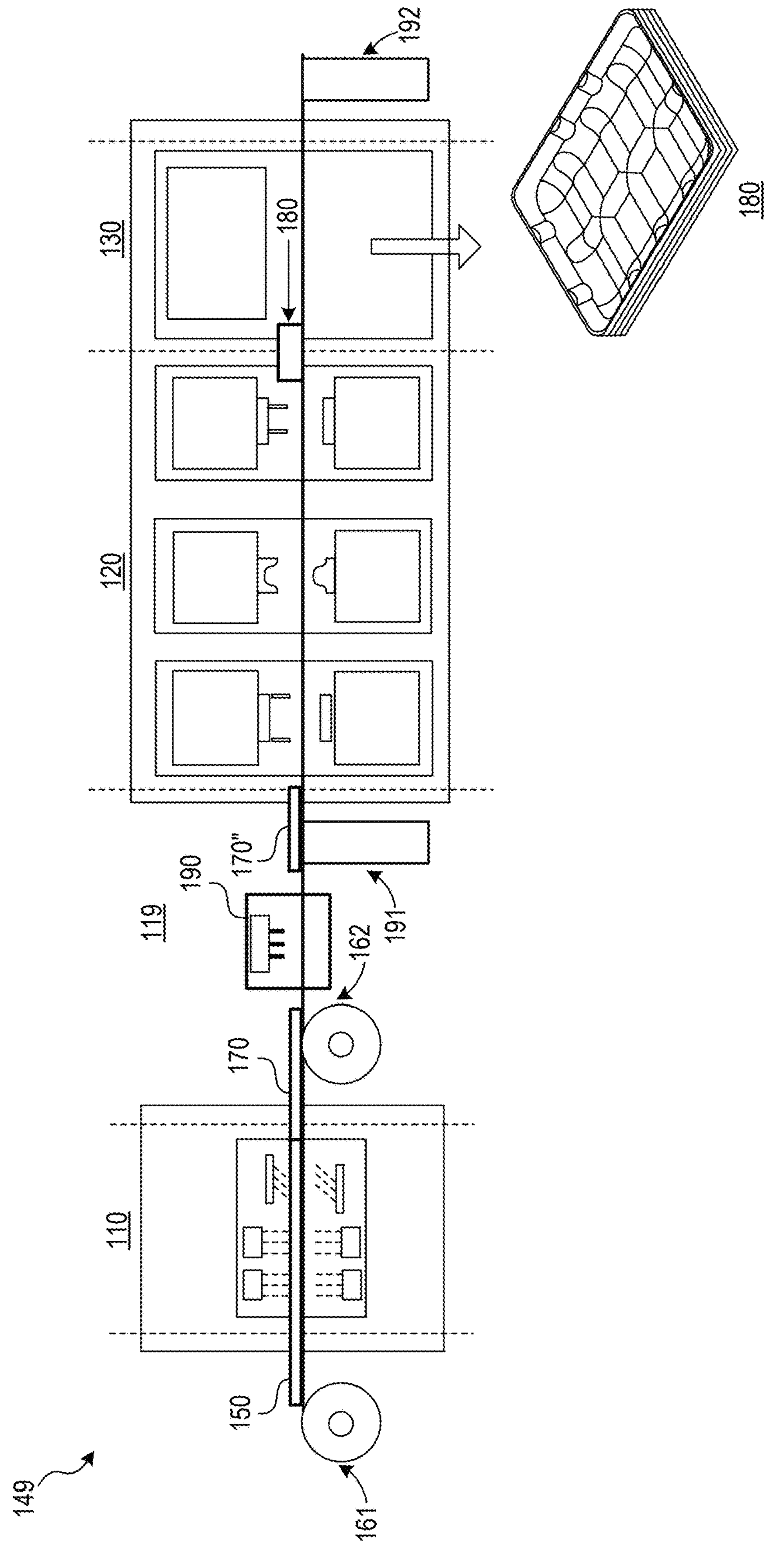
FIG. 1D is a diagram depicting a system for implementing the method shown in FIG. 1A, in which a conditioned paper web is cut and/or slitted before a forming stage, in accordance with embodiments of the present technology.

FIG. 1D shows an example embodiment of the fiber-based packaging product production system 140 from FIG. 1B, shown as system 149 in FIG. 1D, that is configured to partially or fully cut, sever, and/or slit the conditioned paper web 170 as a step before the dry forming process 120 of the method 100, in accordance with the disclosed technology. As shown in FIG. 1D, in some embodiments, the method 100 includes an intermediate cutting process 119 after the conditioning process 110 to divide the conditioned paper web 170 into conditioned paper web portions 170", e.g., referred to as "blanks" or "sections." The conditioned paper web sections 170 then continue to the subsequent dry molding process 120 (and optional transport process 130) of the method 100. In such embodiments of the system 149, for example, a cutting and/or slitting device 190 receives the conditioned paper web 170, e.g., which can be a roll of the conditioned paper web 170, and can sever the received conditioned paper web 170 into portions that form the sections 170". The size, shape, and other features of the sections 170" can be formed (e.g., cut and/or slit) based on predetermined dimension(s) parameters for the received conditioned paper web 170. For example, implementation of the process 119 can configure the sections 170" to be of any desired size prior to the dry forming process 120.

In some embodiments, for example, the cutting and/or slitting device 190 can include a cross-cutter device including one or more blades or other sharp surfaces that can perform cross-cutting of the conditioned paper web portions 170 into the conditioned paper web sections 170". In some embodiments, for example, the cutting and/or slitting device 190 can include a conveyer unit, e.g., comprising a feed belt or wire between an initial point 191 and end point 129, which can be coupled to or integrated with a conveyer unit of the apparatuses of the system 149 that implement the conditioning process 110 and the dry forming process 120. For example, in some embodiments of the system 149, the process 110 can be implemented by a roll-to-roll continuous feed embodiment of the conditioning process 110, which is the conditioned paper web 170 is passed to the conveyer unit (e.g., feed belt or wire) of the cutting and/or slitting device 190 to perform the intermediate cutting process 119 and provide the conditioned paper web sections 170" to the second section 142 of the system 149 (to perform the dry forming process 120) along the same or different conveyer unit (e.g., feed belt or wire) of the second section 142. In some embodiments, the cutting or slitting of the continuous paper web 170 into sections 170" can occur at other stages of the method 100, such as before and/or during a conditioning step.

Select Characteristics of the Paper Web

The paper web 150 may be produced using a variety of constituent materials and may be provided in a wide range of weights and thickness. For example, suitable fiber types include: (1) cellulose fibers, such as fluff web or pulp webs; (2) biowaste or agriculture waste, such as chitosan flakes, rice hulls, wheat or other grain straws, sugar cane bagasse, and the like; and (3) virgin and recycle fibers such as kraft, card stock, poster board, and the like. The material may be woven or non-woven and may be selected from a variety of virgin and recycled materials.

The basis weight of paper web 150, e.g., measured in gsm (grams per square meter), may also be selected depending upon the particular application. In general, it may be advantageous for the paper to exhibit a high "flow"—unlike traditional pressed paper, thereby allowing it to withstand the forces applied during the forming process. In some embodiments, the paper basis weight can be between 100-1000 gsm (e.g., preferably between 300-800 gsm for some implementations, and for some implementations be about 750 gsm±1%). The thickness of the paper may also vary, but in many embodiments the paper thickness (caliper measurement) is between 0.2-3.0 mm (e.g., preferably 0.4-1.3 mm for some implementations, and for some implementations be about 1.4 mm±1%).

The web itself may be formed using a variety of technologies, such as air-laid, dry-laid, or wet-laid fiber materials and can be processed using varying ratios of multiple materials or any single material. In some example embodiments, the fiber type includes cellulose fibers, such as fluff web cellulose fibers, pulp web cellulose fibers, or softwood cellulose fibers. In some embodiments, the web can be made from other non-woven materials, recycled material, virgin materials, and/or combinations thereof.

With respect to physical properties of the paper web 150, higher burst strength, burst index, and greater tensile elongation are preferred (for use in the conditioning process 110) because the conditioning of the paper web 150 having such properties can improve overall yield and product performance characteristics of the finished paper-based packaging product 180. In some embodiments, for example, the paper web 150 can be selected and/or configured to have a burst index between 0.6-2.4 KPa/gsm (e.g., preferably between 1.2-1.9 KPa/gsm for some implementations).

Select Embodiments of the Conditioning Processes

In some embodiments of the conditioning process 110, for example, the moisture content of the initially-fed paper web 150 is altered (e.g., optimized) to a predetermined level to control the amount of water in the paper web 150 before the dry molding stage. MC adjustment or optimization can occur prior to, during, and/or after additive(s) treatment. For example, too much moisture can cause detrimental effects such as excess steam that can cause delamination of the paper material and/or de-gassing of additives; whereas too little moisture can result in cracks and tearing of the paper web 150 during molding. In some embodiments, for example, MC optimization is performed based on a particular additive. MC optimization can include adding water and/or humidity to the paper web 150; and/or MC optimization can include applying heat to (partially) dry the paper web 150, for obtaining the desired amount of moisture of the initially-fed paper web 150, of the paper web 150 during additive(s) treatment, and/or of the conditioned paper web 170. The MC of the web 150 can be detected with one or more moisture meters (e.g., an infrared sensor) positioned in line with the moving roll so as to detect MC of the web 150 before, during, and/or after the conditioning process 110. In such embodiments, the moisture meter can be positioned above and/or below the unfurled web 150 to detect MC from a first surface and/or a second surface of the web 150. In some embodiments, the MC is determined based on a known dry weight and the measured current weight. The MC detection or determination can be performed, for example, in advance of the hydration process to calibrate the hydration process parameters based on the current MC of the web 150 and/or as a quality check to confirm the web 150 is at the appropriate MC for molding. In some embodiments, the MC of the web 150 is known and the parameters for MC optimization processes are selected based on the identified MC.

The conditioning process 110 may include incorporating one or more additives to the paper web 150. For example, to enhance structural rigidity a strength additive may be incorporated into, placed on the surface of, or otherwise carried by paper web 150. Strength additives can include liquid starches available commercially as Topcat® L98 cationic additive, Hercobond® in a range of 0.1% to 5%, e.g., preferably 0.5% to 2.5% for some implementations, and for some implementations be about 2.0%±1%. Alternatively or in addition, the liquid starch may be combined with low charge liquid cationic starches such as those available as Penbond® cationic additive and PAF 9137 BR cationic additive to achieve the range of 0.1% to 5%, e.g., preferably 0.5% to 2.0% for some implementations. To increase the dry strength, the paper web 150 may be conditioned with other starches. Examples include polyamide-epichlorohydrin (PAE) resins, such as Kymene 920A, Kymene 1500, or other wet strength additives to achieve the range of 0.1% to 5%, e.g., preferably 0.5% to 2.0% for some implementations.

The conditioning process 110 may include incorporating one or more additives may that enhance the barrier properties of the paper web 150, such as water proofing agents, hydrophobic additives, oleophobic additives, water vapor barriers, and/or oxygen barriers. Barrier additives can include stearate salts, such as zinc stearate and/or magnesium stearate, which have been found to add both hydrophobic and oleophobic properties to paper web 150. The stearate additives are dispensed to achieve between 1.0-20.0% stearate salt internal/external chemistry. For example, zinc stearate and/or magnesium stearate are dispensed to achieve between 5%-20% stearate chemistry internally or on the surface. As best performance, for example, stearate additives are dispensed to achieve approximately a 10%-15% stearate internal or externally.

In some embodiments, such as for non-single-use products, the paper web 150 can be conditioned with an additive having hydrophobic properties. For example, an alkylketene dimer (AKD), and/or long chain diketenes, alkyl succinic anhydride (ASA) and/or some wax may be included as an additional moisture/water barrier. Those additives are dispensed to achieve approximately a 1%-10% internally or externally, e.g., preferably 2%-4% for some implementations, and for some implementations be about 2.3%+1%.

The one or more hydrophobic and/or oleophobic additives may also or alternatively include polysaccharides, such as NCC, pectin, and alginate, which have been found to add hydrophobic and/or oleophobic as well as water vapor and oxygen barrier properties to paper web 150. In some embodiments, polysaccharides are dispensed to achieve between 5%-25% internal or external, chemistry. In select embodiments, for example, polysaccharide additives are dispensed to achieve approximately a 10%-15% polysaccharides internally or externally. In some embodiments, a crosslinker such as Citric Acid or Malic acid can be added for better barrier performance. In some embodiments, a plasticizer such as xylitol, polyglycerol might also be added for extra flexibility.

The one or more additives can include one or several proteins or a combination of polysaccharides and protein, which have been found to add hydrophobic and/or oleophobic as well as water vapor and oxygen barrier properties to paper web 150. For example, the one or more additives can include casein, zein, and the like that are sprayed or otherwise deposited across regions of the web 150 to provide a wide-spread water vapor barrier and/or oxygen barrier. In some embodiments, the proteins or protein combinations are dispensed to achieve approximately a 1%-20% internally or externally, e.g., preferably 5%-15% for some implementations.

In various embodiments, the one or more additives may include one or more fillers that add hydrophobic and/or oleophobic properties, as well as water vapor and oxygen barrier and strength properties, to paper web 150. These fillers can include, for example: clay, MFC, MCC, and/or CNF. For some implementations, proteins are dispensed to achieve approximately a 1%-20% internally or externally, e.g., preferably 2.5%-10%. The fillers can be impregnated or otherwise added inside to the web 150 itself to make the web 150 denser and less porous. In some embodiments, the fillers may be disposed (e.g., sprayed) on a surface of the web 150. In some embodiments, the conditioning process can include disposing fillers as well as proteins such that they can operate together to provide oxygen or water vapor barrier properties.

In various embodiments, the one or more additives may include water soluble polymers to serve as strength additives or stabilizing agents. These polymers can include polyvinyl alcohol (PVA), modified starch, carboxymethyl cellulose (CMC), with and without crosslinkers and/or plasticizers. Those polymers are dispensed to achieve approximately a 1%-25% internally or externally, e.g., preferably 2.5%-15% for some implementations.

In some embodiments, one or more laminations (additional layers) may be coupled to a surface (e.g., a top side and/or a bottom side) of the paper web 150 to provide select properties that enhance the molding process and/or the finished product. For example, lamination layers can include biopolymer films such as polylactic acids (PLAs), thermoplastic starch, and cellulose acetate (CA) and polyhydroxy butyrate (PHB).

Figure 2:
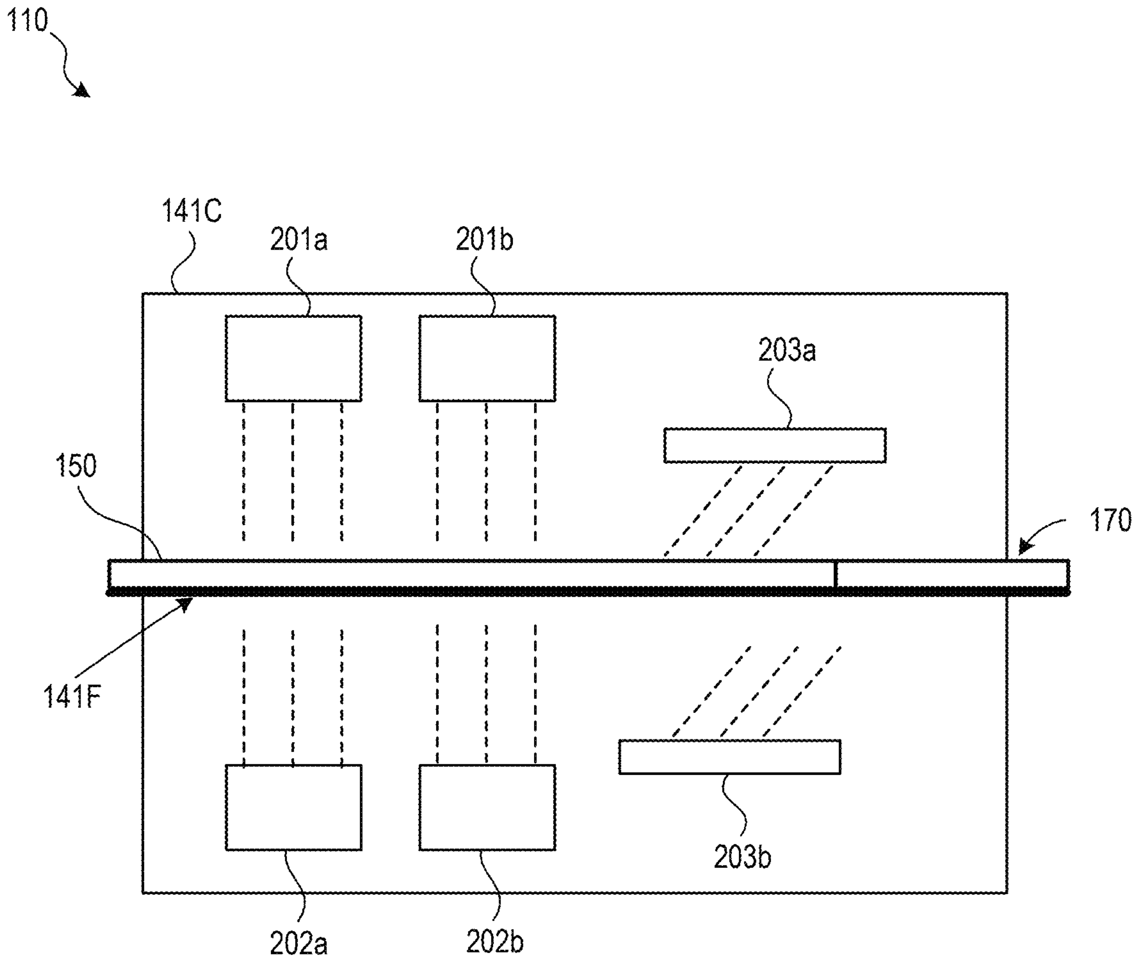
FIG. 2 is a diagram illustrating a conditioning subsystem for performing a conditioning process for a web-fed dry forming manufacturing method in accordance with various embodiments of the present technology.

FIG. 2 shows a diagram depicting a conditioning subsystem for performing the conditioning process 110 in accordance with various embodiments of the method 100, implemented in the first section 141 of the fiber-based packaging product production system 140. In some embodiments, for example, the conditioning process 110 may include web-feeding the paper web 150 into a chamber 141C of the first section 141 that includes a plurality of nozzles or other dispensers 201 and/or 202 situated above and/or below, respectively, a feed belt or wire 141F moving the paper web 150. For example, as the paper web 150 moves laterally through the exemplary chamber 141C during the conditioning process 110, at least one upper nozzle 201*a*, 201*b* configured above the feed belt or wire 141F in an upper region of the chamber 141C can dispense the one or more additives; and/or at least one lower nozzle 202*a*, 202*b* configured below the feed belt or wire 141F in a lower region of the chamber 141C can dispense the one or more additives. The example dispensers are configured to introduce the one or more additives into the environment intrinsically or extrinsically. The additives may be provided online or offline, as described above with respect to FIG. 1B and FIG. 1C, respectively. In some examples, conventional method(s) for liquid or solid application may be employed for chemical application of the one or more additives on the paper web 150. Some examples include high- or low-pressure spray, aerosol, atomization, saturated high temperature, dry steam, wet steam, or the like. In some embodiments, only one side of paper web 150 is treated; in others, both sides are treated. Both sides may be treated with the same additives or with different combinations of additives.

Paper web wetting or drying may be required for moisture content (MC) optimization. This process can be implemented to provide the desired (requisite) moisture content parameter (MC %) as defined by product and process requirements (e.g., improve yield, strength, barrier performance, or other), which can be in a range of 0%-25%, or more preferably in a range of 6%-20%. For example, for some applications of the web-fed fiber material dry forming method 100, the moisture content parameter of the paper web 150 can be conditioned during the conditioning process 110 to be in a range of 10%-12%, e.g., prior to the dry forming process 120.

In some implementations of the conditioning process 110, the plurality of nozzles or other dispensers 201 and/or 202 can be configured to spray water or provide steam at the paper web 150 while continuously fed through the chamber 141C to provide moisture to obtain the desired moisture content parameter (MC %). For instance, for a paper web 150 that has a lower MC % than desired, the earlier nozzle(s) 201*a*, 201*b* can be used to provide water or steam to bring the paper web 150 to the desired MC % prior to the later nozzle(s) 201*b*, 202*b*, for example, which may be used to apply one or more additives to the paper web 150 having the desired MC % for proper conditioning.

In some embodiments of the first section 141, for example, the first section 141 may include one or more heating units 203 (shown in FIG. 2 as heating units 203*a* above and 203*b* below the paper web 150 continuously fed during the conditioning process 110). The one or more heating units 203 can be used to provide heat to dry the paper web 150 to a desired moisture content and/or desired temperature, e.g., for applying additive(s) and/or preparing the conditioned paper web 170 for the subsequent dry forming process 120.

In some implementations, for example, the one or more heating units 203 can be used to bring the surface of the conditioned (or unconditioned) paper web 150 to a desired temperature, e.g., curing, drying, or causing diffusion of the additive through the paper web 150, depending upon the application. In some embodiments, for example, the one or more heating units 203 can include an induction heater device or a radiation heater device. In some embodiments of the first section 141 of the system 140, other components (not shown) may be included, such as: UV lamps, sensors, and/or fans or other mechanisms to cause laminar or turbulent flow within the conditioning chamber 141C.

For example, in some implementations, the one or more heating units 203 (alone and/or in compilation with the plurality of nozzles or other dispensers 201 and/or 202) can be configured to produce a desired moisture content (e.g., 10%-12% MC %) with treatment for penetrating the fiber web with wet or saturated dry steam at a temperature between 135° C.-150° C., e.g., prior to the dry molding process 120.

In some embodiments of the conditioning process 110, for example, the MC % optimization may be performed in a pre-conditioning zone (of the first section 141) prior to additives deposition or integration zone (of the first section 141).

In some embodiments, such as those shown in the example system 145 (shown in FIG. 1C), the storage 165 may be set to a suitable temperature, pressure, and humidity to achieve prescribed moisture content of the paper material (on spool 162) post conditioning 160. The environment is preferably controlled to achieve rolled paper web moisture content between 0%-25%, e.g., including between 6%-20% moisture content for some implementations, and, preferably for some implementations, for example, 10%-12% MC prior to the dry molding process 120.

In some embodiments of the conditioning process 110, the plurality of nozzles or other dispensers 201 and/or 202 includes spray nozzles that cause the additive to impinge upon the surface(s) of paper web 150, e.g., while being continuously fed in the first section 141. In some embodiments, for example, a vapor (gas form) of additives is employed to achieve vapor deposition. In some embodiments, for example, an aerosol (suspended liquids and/or solids) is deployed within the chamber used in connection with conditioning 110. In some embodiments, for example, masking is used to selectively treat regions of paper web 150, while leaving other regions untreated. In general, the speed of the paper web 150 and the rate of deposition of additives is fine-tuned to achieve a desired internal chemistry of the finished product.

The additives selected for use in the conditioning process 110 can depend upon, among other things, the structural nature and intended use of the finished product 180 by the method 100.

In some embodiments, the target pH for the paper web 150 ranges from 4.0 to 12.0, e.g., preferably from 8.0 to 10.0 for some implementations. This pH will vary depending upon the nature of the pulp material and additives dispensed during conditioning. Note that, through experimentation, the internal chemistry, pH, and other intrinsic characteristics of the finished product can be correlated to the process parameters used for nozzles 201 and 202, heaters 203, and the like.

Select Embodiments of the Dry Molding Process

Figure 3A:
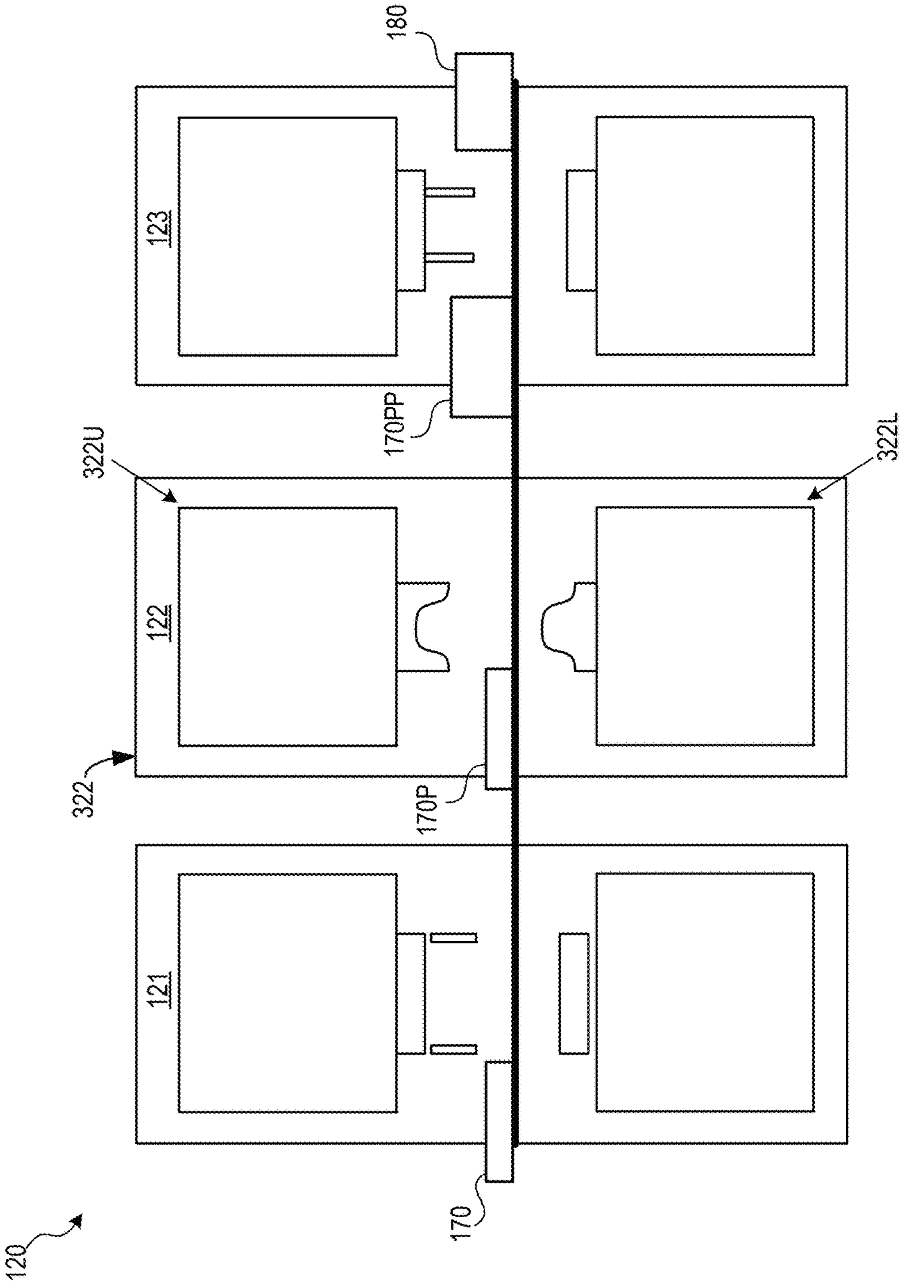
FIG. 3A is a diagram illustrating a molding subsystem for a web-fed dry forming manufacturing method in accordance with various embodiments of the present technology.
Figure 3B:
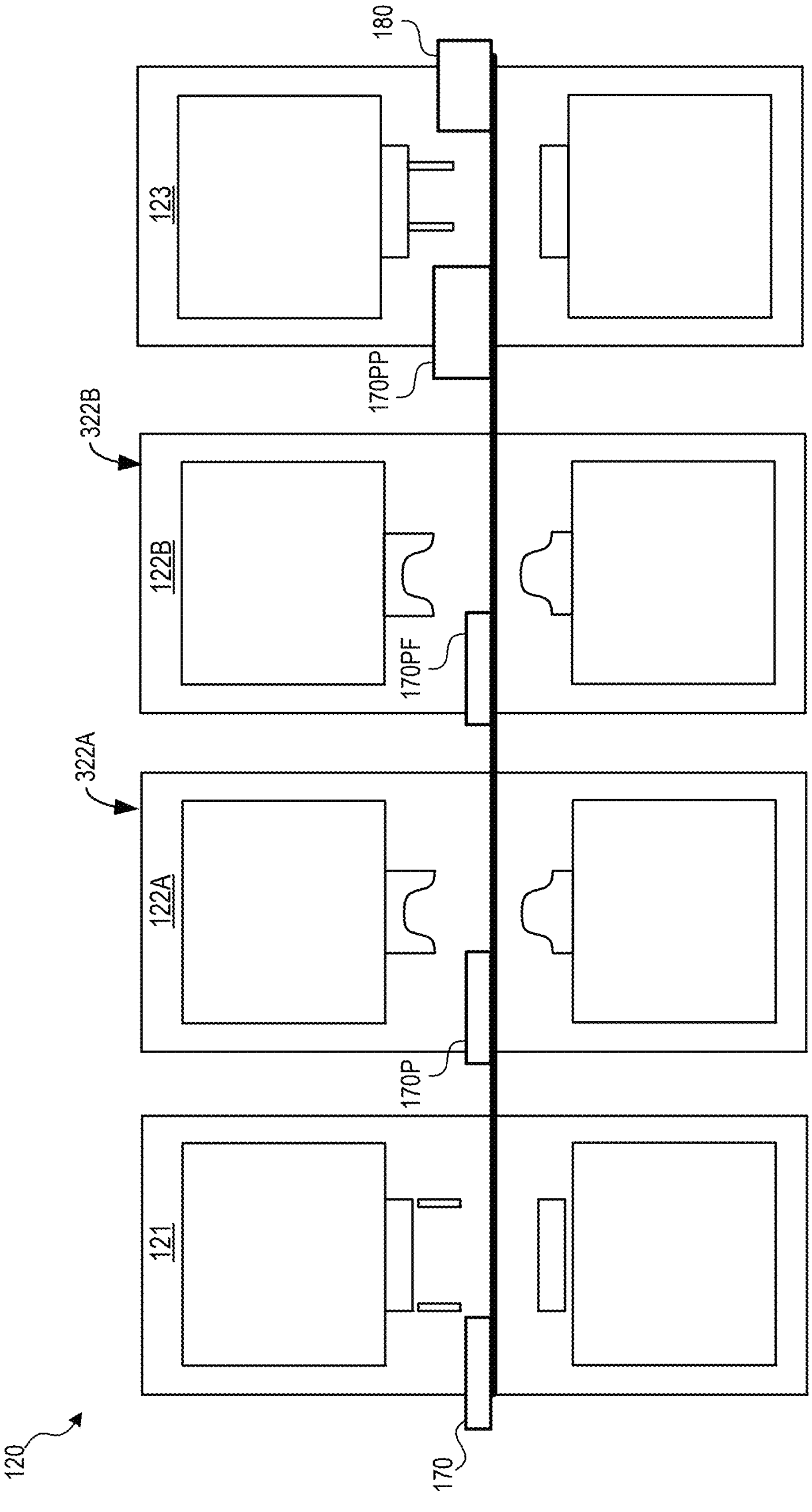
FIG. 3B is a diagram illustrating a molding subsystem, for a web-fed dry forming manufacturing method including a sequence of two press steps in accordance with embodiments of the present technology.

FIGS. 3A and 3B show example embodiments of the dry molding process 120 to form the finished paper-based packaging product 180. FIG. 3A illustrates a process involving a single pressing step 122, while FIG. 3B illustrates a process involving two-pressing steps, i.e., a first pressing process 122A and a second pressing process 122B, which may be done at different pressures/temperatures, as described below. In some embodiments of the single pressing step process shown in FIG. 3A, for example, the single pressing process 122 can be implemented via a press 322. In some embodiments of the two-pressing steps process shown in FIG. 3B, for example, the first pressing process 122A can be implemented via a first press 322A, and the second pressing process 122B can be implemented via a second press 322B; whereas in some embodiments of the two-pressing steps process, for example, the first pressing process 122A and the second pressing process 122B can be implemented by a single press machine with multiple presses (e.g., the first press 322A and the second press 322B).

Referring now to FIG. 3A, in the illustrated embodiment, for example, the dry molding process 120 can include a sequence of three processes: a perforation (or pre-slitting) process 121, a pressing process 122, and a cutting process 123.

In some example embodiments, the perforation process 121 includes cutting, stamping, and/or slitting the conditioned paper web 170 in a predetermined arrangement and to a predetermined depth to facilitate deformation of the paper during subsequent steps. For example, cutting members (e.g., blades) can be arranged in patterns and/or moved to perforate the paper to create a pattern of cut lines along the web 150. The perforation process 121 can provide a form of stress-relief that prevents or reduces the likelihood tearing and folding of paper during forming, as well as enable deeper draw products and reduced trim waste. This allows multiple individual mold tools to be located adjacent to each other such that multiple different molded pieces can be formed at the same time during a single forming operation (referred to as "cavitation"). For example, the optional slitting step of the perforation process 121 can help define and facilitate the formation of multiple cavities for the final product(s) such that the same multiple cavities formed at the perforation process 121 avoid interference with the forming of adjacent cavities during the dry molding step. As such, the cavitation provided for by the perforation process 121 increases the efficiency of the system, while making optimal use of the web 150 (e.g., by reducing waste).

Figure 4:
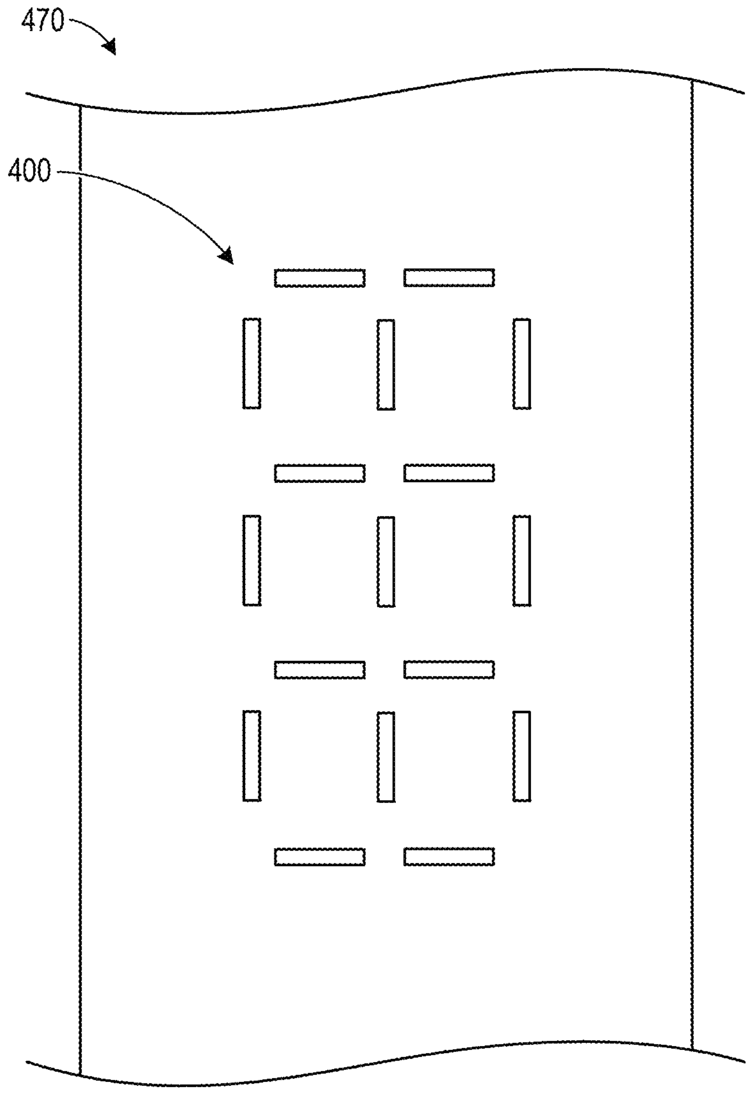
FIG. 4 illustrates a portion of a web after a perforation or "pre-slitting" process of a web-fed dry forming manufacturing method in accordance with some embodiments of the present technology.

FIG. 4 shows a diagram of an example web-fed conditioned paper web 470, in which a matrix of vertical and horizontal slits 400 are made in the conditioned paper web 470 near the perimeter of the regions that are going to be compressed in the subsequent steps of the dry forming process 120. It will be appreciated that the example shown in FIG. 4 is in no way meant to be limiting, and any suitable shape, pitch, position, and depth of perforations or slits may be employed in any particular application.

After the perforation process 121 including the optional pre-slitting step, the conditioned paper web 170 is moved through the second section 142 to a sub-section where the pressing step 122 (FIG. 3A) or pressing steps 122A, 122B (FIG. 3B) are implemented. Referring to FIG. 3A, for example, either hot or cold forming pressing is performed, in which the perforated-conditioned paper web 170P is pressed between upper and lower halves of the press 322 (upper press 322U and lower press 322L), thereby producing a preliminary product structure 170PP. The force, speed, and surface features of the upper and lower halves of the press 322 can vary depending upon what the desired properties, structure, and nature are to be for the final product 180.

Referring to FIG. 3B, in a two-press embodiment, the first pressing process 122A involves pressing the perforated-conditioned paper web 170P to an optimized percentage (e.g., 5%-90%) prior to final pressing process 122B that can pre-shape the first-pressed paper structure 170PF to prepare for the preliminary product structure 170PP before the final pattering/cutting process 123 to produce the final product and improve yields. This exemplary two-step pressing process 122A, 122B can also enable undercuts, snap-fit features, and is particularly efficacious in forming certain types of lids, deeper draw products, and low-negative draft angles. Forming conditions may be low to high pressure (e.g., 20-4000 psi), and low to high temperature (from standard room temperature to 500° F., for example), depending upon the application.

During the example second pressing process 122B, for example, hot-pressing/forming can take place with a prescribed moisture content range from about 0-25%. The press temperature preferably ranges from 210°-500° F., e.g., preferably between 260°-430° F. for some implementations. Pressure required for dry-forming paper fiber ranges from 22-6,000 psi, e.g., preferably between 200-4,000 psi for some implementations (e.g., 350-750 psi), depending on product geometry and other factors known to those skilled in the art. For example, a pressure range of 200-4000 psi (e.g., 1.4-27.6 MPa) may be required to form at least a part of a geometry and/or area of the first-pressed paper structure 170PF to prepare for the preliminary product structure 170PP. The dwell time during which the forming pressure is applied for either or both first and second press may be of a duration between 0.1-3.0 seconds (e.g., 0.2-2 seconds).

Referring to both FIG. 3A and FIG. 3B, after the pressing process 122, the pressed region of the conditioned paper web 170 (i.e., preliminary product structure 170PP) is die cut in a predetermined pattern during a cutting process 123, e.g., to divide the components into individual pieces. In some example embodiments, for example, the preliminary product structure 170PP may be cut all the way through around the perimeter of each component, or small regions may be left attached prior to transport. A variety of trim methods may be employed in this process 230, e.g., such as steel rule die, match metal, laser cutting, and the like.

In some implementations of the dry molding process, a molded final component (e.g., a lid for a container, such as a margarine tub) can be formed via the second section of the system 140 using one or more of the following operating conditions: (i) a 150° C. tool temperature, (ii) a forming pressure in a range of 450-750 psi for structures having around 0.8 mm wall thickness and 700-800 gsm (e.g., for the surface area of particular final product types, like lids), and/or (iii) a 0.5 second forming dwell time under pressure.

Select Embodiments of the Transport Process

After the conditioned paper web 170 (e.g., preliminary product structure 170PP) has been formed and die cut to produce the finished paper-based packaging product 180 (i.e., multiple individual paper-based packaging products), the transport process 130 is implemented to suitably remove the finished products from the excess paper web portions after the cutting process 123, e.g., prior to the remaining portions of the web being rolled onto web rewind roll 102. The removal of the finished products 180 may be accomplished via a pick-and-place robot or through any other electromechanical apparatus configured to remove and stack the finished products 180. In some implementations of the transport process 130, for example, the removed finished products 180 can be put into a storage container (e.g., shipping and/or storage box) for various subsequent uses. In some implementations of the transport process 130, the process 130 can include ejecting and/or stacking the final products 180 for packing or transfer to a coating operation, a printing operation, or other.

Figure 5:
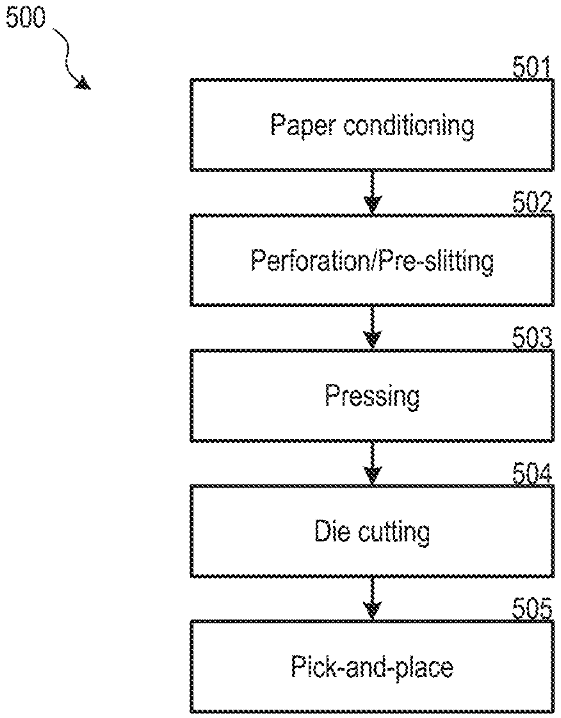
FIG. 5 is a flow chart depicting a dry forming process in accordance with various embodiments of the present technology.

FIG. 5 shows a flow diagram illustrating an example embodiment of a method 500 for producing paper-based packaging articles, in accordance with the method 100. In some embodiments, for example, the method 500 includes a paper conditioning process 501 in accordance with example embodiments of the condition process 110. The method 500 includes a perforation process 502 in accordance with example embodiments of the perforation process 121. The method 500 includes a pressing process 503 in accordance with example embodiments of the single pressing process 122 or the dual pressing process 122A, 122B. The method 500 includes a die cutting process 504 in accordance with example embodiments of the cutting/pattern process 123. The method 500 includes a transport process 505 in accordance with the transport process 130. Additional processes and/or steps may also be included within the process flow of the method 500, e.g., depending upon the application.

In some example embodiments of the method 500, the final products 180 can be aggregated after their applicable packaging uses (e.g., recycled), such that the aggregated recycled packaging products are rewound in a skeleton and processed into the fiber web to be used as feedstock for another implementation of the method 100.

Figure 6:
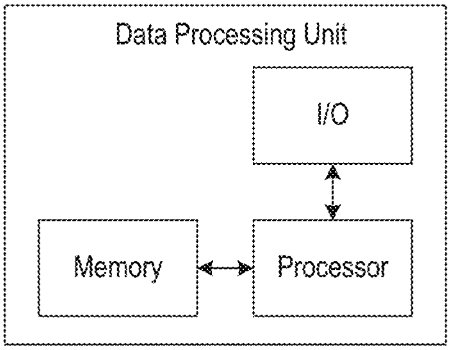
FIG. 6 shows a block diagram of a data processing unit for some example embodiments of the fiber-based packaging product production systems configured in accordance with the present technology.

FIG. 6 shows a block diagram of an example embodiment of data processing unit for some example embodiments of the fiber-based packaging product production system 140 (FIG. 1B). The system 140 may include one or multiple data processing units associated with a section of the system 140, such as the first section 141, the second section 142, and/or the third section 143. The data processing unit of the system 140 includes at least one processor to process data, at least one memory in communication with the processor(s) to store data, and/or an input/output unit (I/O) to interface the processor(s) and/or memory(ies) to other sections, modules, units, or devices of the system 140 or external devices. For example, the processor can include a central processing unit (CPU), a graphics processing unit (GPU), and/or a microcontroller unit (MCU). For example, the memory can include and store processor-executable code, which when executed by the processor, configures the data processing unit to perform various operations, e.g., such as receiving information, commands, and/or data, processing information and data, and transmitting or providing information/data to another device. In some implementations, the data processing unit can transmit raw or processed data to a computer system or communication network accessible via the Internet (referred to as 'the cloud') that includes one or more remote computational processing devices (e.g., servers in the cloud). To support various functions of the data processing unit, the memory can store information and data, such as instructions, software, values, images, and other data processed or referenced by the processor. For example, various types of Random Access Memory (RAM) devices, Read Only Memory (ROM) devices, Flash Memory devices, and other suitable storage media can be used to implement storage functions of the memory unit. The I/O of the data processing unit can interface the data processing unit with the wireless communications unit to utilize various types of wired or wireless interfaces compatible with typical data communication standards, for example, which can be used in communications of the data processing unit with other devices, such as a wired or wireless communication device (e.g., tablet, laptop, smartphone or other computer or computing device) in communication with the data processing unit of the system 140. For example, the data processing unit can be wireless communication, via a wireless transmitter/receiver (Tx/Rx) unit, e.g., including, but not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G/6G cellular communication methods, NFC (Near Field Communication), and/or parallel interfaces, or other. The I/O of the data processing unit can also interface with other external interfaces, sources of data storage, and/or visual or audio display devices, etc. to retrieve and transfer data and information that can be processed by the processor, stored in the memory unit, or exhibited on an output unit of the system 140 or an external device. For example, a display unit of the system 140 can be configured to be in data communication with the data processing unit, e.g., via the I/O, to provide a visual display, an audio display, and/or other sensory display that produces the user interface of the software application of the disclosed technology for health management. In some examples, the display unit can include various types of screen displays, speakers, or printing interfaces, e.g., including but not limited to, light emitting diode (LED), or liquid crystal display (LCD) monitor or screen, cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

In many cases, the techniques relating to additives, paper composition, and the like for wet molding may apply to dry molding in accordance with the present technology. In that regard, the systems and methods described above may incorporate by reference the disclosures of the following patent documents in their entirety and for all purposes: U.S. Pat. Pub. No. 2020/0206984, "Methods, Apparatus, and Chemical Compositions for Selectively Coating Fiber-Based Food Containers," U.S. Pat. No. 10,428,467, "Methods and Apparatus for Manufacturing Fiber-Based Meat Products," U.S. Pat. No. 9,988,199, "Methods and Apparatus for Manufacturing Fiber-Based Microwavable Food Containers," U.S. Pat. No. 10,036,126, "Methods for Manufacturing Fiber-Based Beverage Lids," U.S. Pat. No. 10,124,926, "Methods and Apparatus for Manufacturing Fiber-Based, Foldable Packaging Assemblies," U.S. Pat. No. 9,856,608, "Methods for Manufacturing Fiber-Based Product Containers," U.S. Pat. No. 10,087,584, "Methods and Apparatus for Manufacturing Fiber-Based Meat Containers," U.S. Pat. No. 9,869,062, "Method for Manufacturing Microwavable Food Containers," U.S. Pat. No. 10,377,547, "Method and Apparatus for In-line Die Cutting of Vacuum Formed Molded Pulp Container," U.S. Pat. No. 10,240,286, "Die Press Assembly for Drying and Cutting Molded Fiber Parts," and U.S. Pat. No. 10,683,611, "Method for Simultaneously Pressing and Cutting a Molded Fiber Part."

EXAMPLES

In some embodiments in accordance with the present technology (example A1), a method of manufacturing a paper-based packaging product includes conditioning a paper web to optimize a moisture content of the paper web and to treat the paper web with at least one additive to form a conditioned paper web; and dry molding the conditioned paper web under one or both of heat and pressure to produce a plurality of finished paper-based packaging products.

Example A2 includes the method of example A1 or any of examples A1-A32, wherein the dry molding comprises: perforating a first region of the conditioned paper web to form a plurality of cavities in the first region; pressing the first region of the conditioned paper web to form a pressed web region; and cutting the pressed web region to form cut product regions, thereby producing the plurality of finished paper-based packaging products.

Example A3 includes the method of example A2 or any of examples A1-A32, wherein the perforating includes applying a plurality of slits in the first region that form multiple cavities for the dry molding to produce the finished paper-based packaging product.

Example A4 includes the method of example A3 or any of examples A1-A32, wherein the multiple cavities provide a stress relief during the pressing to prevent tearing and folding of the conditioned paper web.

Example A5 includes the method of example A2 or any of examples A1-A32, wherein the pressing the first region includes depressing a mold structure on one or more portions of the first region of the conditioned paper web to a predetermined depth to facilitate deformation of the first region.

Example A6 includes the method of example A2 or any of examples A1-A32, wherein the pressing includes a first pressing operation and a second pressing operation, wherein at least one of pressure and temperature differs between the first and second press operations.

Example A7 includes the method of example A2 or any of examples A1-A32, wherein the pressing is implemented with a molding tool temperature of 100° C. to 150° C.

Example A8 includes the method of example A2 or any of examples A1-A32, wherein the pressing comprises applying molding pressure of 350 psi to 750 psi.

Example A9 includes the method of example A2 or any of examples A1-A32, wherein the pressing comprises applying molding pressure for a dwell time of 0.2 s to 2 s.

Example A10 includes the method of example A2 or any of examples A1-A32, wherein the cutting includes die-cutting at least a portion of the pressed web region in a predetermined pattern to divide the pressed web region into individual pieces corresponding to individual finished paper-based packaging products of the plurality.

Example A11 includes the method of example A1 or any of examples A1-A32, wherein optimizing the moisture content includes applying wet steam or dry steam to the paper web prior to forming the conditioned paper web.

Example A12 includes the method of example A11 or any of examples A1-A32, wherein the applying the wet steam or dry steam is within a temperature range of 100° C. to 150° C.

Example A13 includes the method of example A1 or any of examples A1-A32, wherein the moisture content of the conditioned paper web, prior to the dry molding, is in a range of 10% to 12%.

Example A14 includes the method of example A1 or any of examples A1-A32, wherein the moisture content of the conditioned paper web, prior to the dry molding, is at most 20%.

Example A15 includes the method of example A1 or any of examples A1-A32, wherein the conditioning the paper web with at least one additive includes applying a plurality of chemical compounds to augment the paper web for at least one property.

Example A16 includes the method of example A15 or any of examples A1-A32, wherein the at least one augmented property includes an increased strength, an increased rigidity, a reduced permeability to oil, water, or vapor.

Example A17 includes the method of example A15 or any of examples A1-A32, wherein the plurality of chemical compounds includes a liquid starch or alkyl ketene dimer (AKD).

Example A18 includes the method of example A17 or any of examples A1-A32, wherein the liquid starch is in a range of 0.5% to 2.5%.

Example A19 includes the method of example A17 or any of examples A1-A32, wherein the liquid starch is in a range of 0.1% to 5.0%.

Example A20 includes the method of example A17 or any of examples A1-A32, wherein the AKD is in a range of 1.0% to 4.0%.

Example A21 includes the method of example A17 or any of examples A1-A32, wherein the AKD is in a range of 0.5% to 10.0%.

Example A22 includes the method of example A21 or any of examples A1-A32, further comprising transporting the finished paper-based packaging product to a storage or subsequent operation.

Example A23 includes the method of example A22 or any of examples A1-A32, wherein the subsequent operation includes one or both of a coating operation and a printing operation.

Example A24 includes the method of example A22 or any of examples A1-A32, further comprising moving remaining paper web to a final web roll.

Example A25 includes the method of example A1 or any of examples A1-A32, wherein the conditioning includes continuously feeding the paper web into a conditioning unit of a system, such that the conditioned paper web formed from the conditioning is continuously fed into a dry molding unit of the system to undergo the dry molding and produce the finished paper-based packaging product.

Example A26 includes the method of example A1 or any of examples A1-A32, further comprising storing the conditioned paper web in a climate-controlled storage unit.

Example A27 includes the method of example A1 or any of examples A1-A32, further comprising dividing the conditioned paper web into a plurality of portions to form conditioned paper web sections.

Example A28 includes the method of example A27 or any of examples A1-A32, wherein the dividing includes cutting the conditioned paper web using a cross cutter.

Example A29 includes the method of example A27 or any of examples A1-A32, wherein the dividing includes slitting the conditioned paper web to form the conditioned paper web sections.

Example A30 includes the method of example A1 or any of examples A1-A32, wherein the paper web is provided from an initial web roll.

Example A31 includes the method of example A1 or any of examples A1-A32, wherein the paper web has one or both of a weight basis of 300 gsm to 800 gsm and a caliper of 0.2 mm to 3.0 mm.

Example A32 includes the method of example A1 or any of examples A1-A31, wherein the paper web has one or both of a weight basis of 100 gsm to 1,000 gsm.

In some embodiments in accordance with the present technology (example A33), a system for manufacturing a paper-based packaging product includes a conditioning apparatus, comprising one or more fluid dispensing units and one or more heating units, configured to condition a paper web that is web-fed into the conditioning apparatus by optimizing a moisture content of the paper web and by treating the paper web with at least one additive to form a conditioned paper web; and a dry forming apparatus, comprising at least one slitting tool, at least one pressing tool, and at least one cutting tool, configured to dry mold one or more portions of the conditioned paper web under one or both of heat and pressure to produce a plurality of finished paper-based packaging products.

Example A34 includes the system of example A33 or any of examples A33-A35, wherein the system further comprises: a product transport apparatus, comprising a pick-and-place device, configured to transport the plurality of finished paper-based packaging products for storage, distribution, or subsequent operation.

Example A35 includes the system of example A33 or any of examples A33-A34, wherein the system is configured to implement the method of any of examples A1-A32.

In some embodiments in accordance with the present technology (example A36), a method of manufacturing a paper-based packaging product includes providing a first web roll comprising a continuous paper web; conditioning the continuous paper web to optimize a moisture content and to treat the paper web with at least one additive to form a conditioned paper web; perforating a first region of the conditioned paper web to form a plurality of cavities in the first region; pressing the first region of the conditioned paper web to form a pressed web region; cutting the pressed web region to form a plurality of finished paper-based packaging products; transporting the finished paper-based packaging products to a storage region; and moving remaining portions of the paper web to a second web roll.

Example A37 includes the method of example A36 or any of examples A36-A39, wherein the pressing step includes a first press operation and a second press operation, wherein at least one of pressure and temperature differ between the first and second press operations.

Example A38 includes the method of example A36 or any of examples A36-A39, wherein the at least one additive includes one or more of a strengthening additive, an oleophobic additive, or a hydrophobic additive.

Example A39 includes the method of example A36 or any of examples A36-A38, wherein the method includes at least one feature of the method of any of examples A1-A32.

In some embodiments in accordance with the present technology (example A40), a system for manufacturing a paper-based packaging product includes a conditioning apparatus, comprising one or more fluid dispensing units and one or more heating units, configured to condition a paper web that is web-fed into the conditioning apparatus by optimizing a moisture content of the paper web and by treating the paper web with at least one additive to form a conditioned paper web; a cutting apparatus, comprising one or more blades cross-cut the conditioned paper web into the conditioned paper web sections; and a dry forming apparatus, comprising at least one slitting tool, at least one pressing tool, and at least one cutting tool, configured to dry mold one or more portions of the conditioned paper web sections under one or both of heat and pressure to produce a plurality of finished paper-based packaging products Example A41 includes the system of example A40 or any of examples A40-A49, wherein the conditioning apparatus includes one or more sensors selected from a group consisting of a humidity sensor, a temperature sensor, a pressure sensor, and a pH sensor, the one or more sensors operable to detect a parameter associated with the moisture content of the paper web prior to and/or after the optimizing or the treating by the conditioning apparatus.

Example A42 includes the system of example A41 or any of examples A40-A49, wherein the conditioning apparatus includes one or more of actuator devices in communication with the one or more sensors and in communication with one or both of the one or more fluid dispensing units and the one or more heating units.

Example A43 includes the system of example A42 or any of examples A40-A49, wherein the one or more actuator devices are configured to control one or both of a fluid dispensing operation and a heating operation by the one or both of the one or more fluid dispensing units and the one or more heating units based at least in part on the parameter detected by the one or more sensors.

Example A44 includes the system of example A43 or any of examples A40-A49, further comprising a computing device, comprising a processor and a memory, in communication with at least one of the conditioning apparatus, the cutting apparatus, or the dry forming apparatus, the computing device having a controller module in communication with the one or more sensors and the one or more actuator devices and configured to process a signal transduced by the one or more sensors associated with the moisture content and produce the parameter, and analyze the parameter with respect to a predetermined moisture content parameter to determine a control instruction to be provided to the actuator to control the one or both of the fluid dispensing operation and the heating operation.

Example A45 includes the system of example A40 or any of examples A40-A49, wherein the cutting apparatus includes a conveyer unit that comprises a feed belt or wire between an initial point and end point of the conveyer unit.

Example A46 includes the system of example A45 or any of examples A40-A49, wherein the conveyer unit is coupled to or integrated with a conveyer unit of one or both of the conditioning apparatus and the dry forming apparatus.

Example A47 includes the system of example A40 or any of examples A40-A49, further comprising a computing device, comprising a processor and a memory, in communication with at least one of the conditioning apparatus, the cutting apparatus, or the dry forming apparatus, the computing device having a controller module configured to control an operation of the at least one of the conditioning apparatus, the cutting apparatus, or the dry forming apparatus.

Example A48 includes the system of example A40 or any of examples A40-A49, further comprising a product transport apparatus, comprising a pick-and-place device, configured to transport the plurality of finished paper-based packaging products for storage, distribution, or subsequent operation.

Example A49 includes the system of example A40 or any of examples A40-A48, wherein the system is configured to implement the method of any of examples A1-A32.

CONCLUSION

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term “data processing unit” or “data processing apparatus” encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for manufacturing a paper-based packaging product, comprising:

a conditioning apparatus, comprising one or more fluid dispensing units and one or more heating units, configured to condition a paper web that is web-fed into the conditioning apparatus by optimizing a moisture content of the paper web and by treating the paper web with at least one additive to form a conditioned paper web;

a cutting apparatus, comprising one or more blades cross-cut the conditioned paper web into conditioned paper web sections; and a dry forming apparatus, comprising at least one slitting tool, at least one pressing tool, and at least one cutting tool, configured to dry mold one or more portions of the conditioned paper web sections under one or both of heat and pressure to produce a plurality of finished paper-based packaging products.

2. The system of claim 1, wherein the conditioning apparatus includes one or more sensors selected from a group consisting of a humidity sensor, a temperature sensor, a pressure sensor, and a pH sensor, the one or more sensors operable to detect a parameter associated with the moisture content of the paper web prior to and/or after the optimizing or the treating by the conditioning apparatus.

3. The system of claim 2, wherein the conditioning apparatus includes one or more of actuator devices in communication with the one or more sensors and in communication with one or both of the one or more fluid dispensing units and the one or more heating units.

4. The system of claim 3, wherein the one or more actuator devices are configured to control one or both of a fluid dispensing operation and a heating operation by the one or both of the one or more fluid dispensing units and the one or more heating units based at least in part on the parameter detected by the one or more sensors.

5. The system of claim 4, further comprising:

a computing device, comprising a processor and a memory, in communication with at least one of the conditioning apparatus, the cutting apparatus, or the dry forming apparatus, the computing device having a controller module in communication with the one or more sensors and the one or more actuator devices and configured to process a signal transduced by the one or more sensors associated with the moisture content and produce the parameter, and analyze the parameter with respect to a predetermined moisture content parameter to determine a control instruction to be provided to the actuator to control the one or both of the fluid dispensing operation and the heating operation.

6. The system of claim 1, further comprising:

a computing device, comprising a processor and a memory, in communication with at least one of the conditioning apparatus, the cutting apparatus, or the dry forming apparatus, the computing device having a controller module configured to control an operation of the at least one of the conditioning apparatus, the cutting apparatus, or the dry forming apparatus.

7. The system of claim 1, further comprising:

a product transport apparatus, comprising a pick-and-place device, configured to transport the plurality of finished paper-based packaging products for storage, distribution, or subsequent operation.

8. A system for manufacturing a paper-based packaging product, comprising:

a conditioning apparatus, comprising one or more fluid dispensing units and one or more heating units, configured to condition a fiber material that is fed into the conditioning apparatus by enhancing a moisture content of the fiber material and by treating the fiber material with at least one additive to form a conditioned paper;

a cutting apparatus, comprising one or more blades cross-cut the conditioned paper into conditioned paper sections; and a dry forming apparatus, comprising at least one slitting tool, at least one pressing tool, and at least one cutting tool, configured to dry mold one or more portions of the conditioned paper sections under one or both of heat and pressure to produce a plurality of finished paper-based packaging products.

9. The system of claim 8, wherein the conditioning apparatus includes one or more sensors selected from a group consisting of a humidity sensor, a temperature sensor, a pressure sensor, and a pH sensor, the one or more sensors operable to detect a parameter associated with the moisture content of the fiber material prior to and/or after the enhancing or the treating by the conditioning apparatus.

10. The system of claim 9, wherein the conditioning apparatus includes one or more of actuator devices in communication with the one or more sensors and in communication with one or both of the one or more fluid dispensing units and the one or more heating units.

11. The system of claim 10, wherein the one or more actuator devices are configured to control one or both of a fluid dispensing operation and a heating operation by the one or both of the one or more fluid dispensing units and the one or more heating units based at least in part on the parameter detected by the one or more sensors.

12. The system of claim 11, further comprising:

a computing device, comprising a processor and a memory, in communication with at least one of the conditioning apparatus, the cutting apparatus, or the dry forming apparatus, the computing device having a controller module in communication with the one or more sensors and the one or more actuator devices and configured to process a signal transduced by the one or more sensors associated with the moisture content and produce the parameter, and analyze the parameter with respect to a predetermined moisture content parameter to determine a control instruction to be provided to the actuator to control the one or both of the fluid dispensing operation and the heating operation.

13. The system of claim 8, further comprising:

a computing device, comprising a processor and a memory, in communication with at least one of the conditioning apparatus, the cutting apparatus, or the dry forming apparatus, the computing device having a controller module configured to control an operation of the at least one of the conditioning apparatus, the cutting apparatus, or the dry forming apparatus.

14. The system of claim 8, further comprising:

a product transport apparatus, comprising a pick-and-place device, configured to transport the plurality of finished paper-based packaging products for storage, distribution, or subsequent operation.

* * * * *